(12) United States Patent
Virtanen

(10) Patent No.: US 10,357,950 B2
(45) Date of Patent: Jul. 23, 2019

(54) METHOD FOR MANUFACTURING AN UNDERLAY MATERIAL, AND UNDERLAY MATERIAL

(71) Applicant: Thomas Virtanen, Espoo (FI)

(72) Inventor: Thomas Virtanen, Espoo (FI)

(*) Notice: Subject to any disclaimer, the term of this patent is extended or adjusted under 35 U.S.C. 154(b) by 181 days.

(21) Appl. No.: 15/432,512

(22) Filed: Feb. 14, 2017

(65) Prior Publication Data

US 2017/0151768 A1 Jun. 1, 2017

Related U.S. Application Data

(62) Division of application No. 14/363,936, filed as application No. PCT/FI2012/051218 on Dec. 7, 2012, now abandoned.

(30) Foreign Application Priority Data

Dec. 7, 2011 (FI) ..................................... 20116234

(51) Int. Cl.
*E04B 2/00* (2006.01)
*E04F 13/00* (2006.01)
(Continued)

(52) U.S. Cl.
CPC .............. *B32B 37/04* (2013.01); *B29C 65/18* (2013.01); *B29C 66/1122* (2013.01);
(Continued)

(58) Field of Classification Search
CPC ......... B29C 65/02; B29C 65/18; B29C 66/43; B29C 66/436; B29C 66/727;
(Continued)

(56) References Cited

U.S. PATENT DOCUMENTS 3,455,772 A 7/1969 Mason et al.
3,881,980 A * 5/1975 Olson ................ B29O 44/5627
156/268
(Continued)

FOREIGN PATENT DOCUMENTS

EP 1038661 9/2000
EP 1038661 A1 * 9/2000 ........... B29C 59/046
(Continued)

OTHER PUBLICATIONS

Finnish Search Report dated Sep. 27, 2012 in corresponding Finland Priority Application.
(Continued)

*Primary Examiner* — Philip C Tucker
*Assistant Examiner* — Brian R Slawski
(74) *Attorney, Agent, or Firm* — Young & Thompson

(57) ABSTRACT

A method for manufacturing an underlay material (8) to be set under parquet or a laminate, the underlay material including a sheet material layer (1) and a flexible cellular plastic material layer (3) bonded under the sheet material layer, and a bottom surface of the cellular plastic layer being processed for providing an air space, whereby the bottom surface of the cellular plastic material layer (3) is processed by melting the cellular plastic material locally for providing an air space (9) and for simultaneously bonding the cellular plastic material layer to the sheet material layer (1). An underlay material manufactured by such a method is also described.

20 Claims, 2 Drawing Sheets

(51) Int. Cl.
| | |
|---|---|
| B29C 59/04 | (2006.01) |
| B31F 1/07 | (2006.01) |
| B29C 65/00 | (2006.01) |
| B32B 37/00 | (2006.01) |
| C08J 5/00 | (2006.01) |
| B65C 9/25 | (2006.01) |
| C09J 5/00 | (2006.01) |
| B29C 65/08 | (2006.01) |
| B30B 5/02 | (2006.01) |
| B30B 5/04 | (2006.01) |
| B30B 15/34 | (2006.01) |
| B32B 3/12 | (2006.01) |
| B32B 3/26 | (2006.01) |
| B32B 3/00 | (2006.01) |
| B29C 49/00 | (2006.01) |
| B29C 59/00 | (2006.01) |
| B29C 59/02 | (2006.01) |
| B28B 11/08 | (2006.01) |
| E04F 15/22 | (2006.01) |
| B32B 37/04 | (2006.01) |
| B32B 38/06 | (2006.01) |
| E04F 15/18 | (2006.01) |
| B32B 37/20 | (2006.01) |
| E04F 15/00 | (2006.01) |
| B32B 37/06 | (2006.01) |
| B29C 65/18 | (2006.01) |
| B32B 5/18 | (2006.01) |
| B32B 37/08 | (2006.01) |

(52) U.S. Cl.
CPC ............ *B29C 66/45* (2013.01); *B29C 66/727* (2013.01); *B29C 66/81433* (2013.01); *B29C 66/83413* (2013.01); *B32B 5/18* (2013.01); *B32B 37/0076* (2013.01); *B32B 37/0084* (2013.01); *B32B 37/06* (2013.01); *B32B 37/203* (2013.01); *B32B 38/06* (2013.01); *E04F 15/00* (2013.01); *E04F 15/18* (2013.01); *E04F 15/185* (2013.01); *E04F 15/186* (2013.01); *B29C 59/04* (2013.01); *B29C 66/221* (2013.01); *B29C 66/71* (2013.01); *B29C 66/73521* (2013.01); *B29C 66/7486* (2013.01); *B32B 37/08* (2013.01); *B32B 2305/022* (2013.01); *B32B 2309/02* (2013.01); *B32B 2471/00* (2013.01); *Y10T 156/1021* (2015.01); *Y10T 428/24504* (2015.01)

(58) Field of Classification Search
CPC ............ B29C 66/83413; B29C 44/321; B29C 44/326; B29C 44/22; B29C 44/221; B29C 44/23; B29C 44/232; B29C 44/234; E04F 15/185; B32B 2305/022; B32B 2471/00; B32B 38/06; B32B 5/18
USPC ... 156/60, 71, 153, 154, 196, 199, 209, 250, 156/251, 256, 257, 259, 268, 269, 270, 156/271, 290, 308.2, 308.4, 309.6, 324, 156/349, 510, 515, 580, 581, 582, 583.1; 428/156, 158, 159, 160, 167, 169, 172; 264/280, 284, 293, 320; 52/309.8, 403.1
See application file for complete search history.

(56) References Cited

U.S. PATENT DOCUMENTS

| | | |
|---|---|---|
| 3,979,489 A | 9/1976 | Sprague |
| 6,837,014 B2 | 1/2005 | Virtanen |
| 2005/0158517 A1* | 7/2005 | Rives ...................... E04F 15/18 428/158 |
| 2006/0165949 A1 | 7/2006 | Segars et al. |
| 2007/0062139 A1* | 3/2007 | Jones ...................... E04F 15/18 52/403.1 |
| 2008/0010930 A1* | 1/2008 | Mao .......................... B32B 3/30 52/403.1 |
| 2010/0068469 A1 | 3/2010 | Wiemers |
| 2013/0227904 A1* | 9/2013 | Amend .................... E04O 2/26 52/309.11 |

FOREIGN PATENT DOCUMENTS

| | | |
|---|---|---|
| JP | 2052732 | 2/1990 |
| WO | 2008053077 | 5/2008 |

OTHER PUBLICATIONS

International Search Report dated Mar. 25, 2013 in corresponding PCT application.
U.S. Appl. No. 14/363,936, filed Jun. 9, 2014.

\* cited by examiner

METHOD FOR MANUFACTURING AN UNDERLAY MATERIAL, AND UNDERLAY MATERIAL

BACKGROUND OF THE INVENTION

Field of the Invention

The invention relates to an underlay material to be set under a floor surface material, such as parquet and a laminate, and to its manufacturing method. More specifically, the invention relates to such an underlay material made up of two material layers.

Description of the Related Art

Regarding the underlay material for parquets and laminates, it is prior known to employ an underlay material made up of two material layers, said underlay material consisting of a substantially flat upper material layer, such as a plastic sheet, and of a flexible material, such as a cellular plastic material, bonded under the plastic sheet. This type of underlay material is typically placed under parquet or a laminate and on top of a concrete floor surface, whereby the upper material layer provided by the plastic sheet of the underlay material functions as a vapor barrier against moisture rising from concrete or condensing in concrete. The underlay material can also be used on top of a wood foundation.

One such underlay material and its manufacturing method is known from patent publication WO 2008/053077. The underlay material disclosed in the publication comprises a flexible cellular plastic layer, said cellular plastic layer having its bottom surface formed with a protrusion pattern for providing an air space between a concrete surface and the cellular plastic layer, and on top of the cellular plastic layer is laid a dense plastic sheet for a moisture insulator and vapor barrier.

U.S. Pat. No. 6,837,014 discloses an optional underlay material, wherein the underlay material is composed of a membrane material, said membrane material having its bottom surface formed with projections of a cellular plastic material for providing an air space between a concrete surface and the membrane material. In the solution according to the publication, the membrane material can be for example plastic, paper or board.

A problem with the foregoing solutions is however the relatively complicated manufacturing process necessitated thereby. In addition, the achievement of a sufficient long-term durability as well as appropriate flexibility is problematic in the manufactured underlay material. Also, the establishment of appropriate air ducts and spaces to enable a removal or expulsion of moisture in several different directions is inconvenient and leads to a high-cost manufacturing process.

BRIEF SUMMARY OF THE INVENTION

What has now been discovered in order to overcome this problem is a new manufacturing method for producing such an underlay material made up of a sheet material and a flexible cellular plastic material.

The manufacturing method of the invention comprises bonding a cellular plastic material to a sheet material simultaneously with the establishment of air provisions to be formed in the cellular plastic material, whereby melting of the cellular plastic material also bonds the cellular plastic material to the sheet material for providing a uniform underlay material. Hence, the underlay manufacturing process is expedited and simplified as a separate operation for bonding the materials to each other is no longer necessary.

Preferably, the manufacturing method of the invention is carried out by conveying the material layers through between two rollers or rolls placed in opposition to each other, whereby the roll placed against the cellular plastic material layer has its surface provided with protrusions, said protrusions of the roll, or the entire roll, having been heated. Thus, the heated roll protrusions, along with pressing between the rolls, melt the cellular plastic material layer at the protrusions to form grooves in the cellular plastic material and press the melted cellular plastic material to the attachment with the sheet material, thus bonding the molten cellular plastic material thereto.

The roll placed against the cellular plastic material has its protrusions preferably designed in view of establishing a uniform air provision pattern on the surface of cellular plastic. This air provision pattern established on the cellular plastic material surface can be for example a pattern made up of two sets of continuous and parallel grooves, said grooves of different sets crossing each other. Hence, the established air provision pattern made up of grooves for a cellular plastic material may comprise for example a plurality of squares or lozenges defined by the grooves. Other types of patterns made up of air provision grooves can also be used, but in any case, the grooves preferably establish a continuous air provision structure across the entire underlay material.

The sheet material and the cellular plastic material useful in the solution of the invention are material webs, whereby these material webs are bonded in connection with manufacturing for an underlay material in a web-like form.

The sheet material may consist for example of plastic, paper and cardboard, such as for example polyethylene or polypropylene. Preferred material thicknesses for a sheet material are 0.01-0.2 mm.

The cellular plastic material may consist of any appropriate cellular plastic, such as for example polyethylene. The cellular plastic material has a material thickness preferably within the range of 1-5 mm.

The underlay material according to the invention has preferably a total thickness of 1-5 mm.

More specifically, the manufacturing method of the invention is characterized by what is presented in the characterizing clause of claim 1, as well as the underlay material of the invention by what is presented in the characterizing clause of claim 6.

The invention will now be described more precisely by way of example with reference to the accompanying figures, in which

DETAILED DESCRIPTION OF THE PREFERRED EMBODIMENTS

Figure 1:
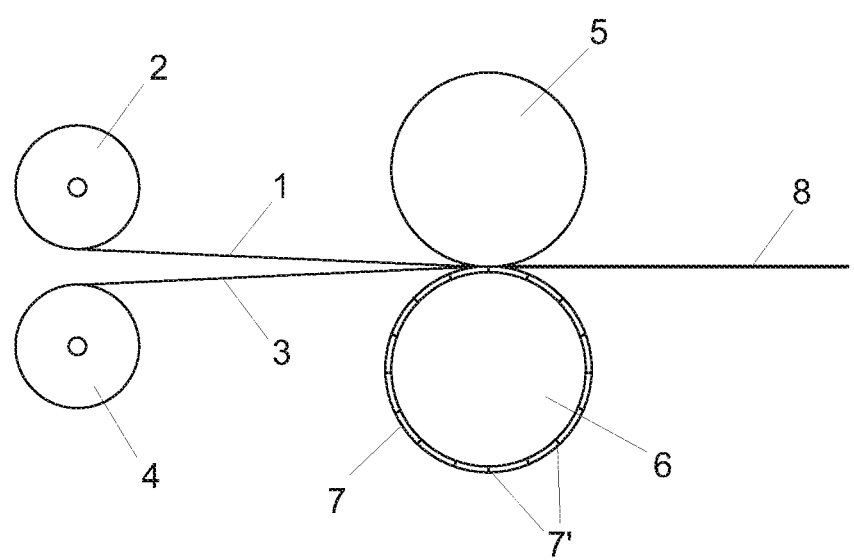
FIG. 1 shows schematically one underlay material manufacturing arrangement according to the invention.

FIG. 1 shows schematically one manufacturing arrangement of the invention, which comprises a reel 2 composed of a sheet material 1 in the form of a web, a reel 4 composed of a cellular plastic material 3 in the form of a web, as well as a pair of press rolls 5 and 6.

In the arrangement of FIG. 1, the sheet material 1 in the form of a web, which in this example consists of plastic sheet, is fed from the reel 2 to a location between the pair of press rolls 5 and 6 with a top surface of the sheet material 1 placing itself against a surface of the smooth roller 5. The cellular plastic material 3 in the form of a web is fed from the reel 4 to a location between the pair of press rolls 5 and 6, such that a top surface of the cellular plastic material 3 places itself against the sheet material 1 and its bottom surface against the roll 6 provided with protrusions 7, 7'.

Either the entire roll 6 or the protrusions 7, 7' of the roll 6 have been heated, for example with heating resistors, the cellular plastic material 3 set against the protrusions 7, 7' being melted thereby.

The manufacture of an underlay material 8 proceeds in the sequence of FIG. 1 simply in such a way that the web type sheet material 1 and cellular plastic material 3 are web-fed from the reels 2 and 4 to a location between the pair of press rolls 5 and 6, the underlay material being produced thereafter simply by rotating the pair of press rolls 5 and 6. At this time, the pair of press rolls has the hot protrusions 7, 7' of its roll 6 melting some of the cellular plastic material 3 in areas coincident with the protrusions in response to both heat and pressure, whereby the cellular plastic material collapses and thereby bonds over its melted areas to the sheet material 1 at the latest when reaching a nip point of the pair of press rolls, i.e. at the point where a surface of the roll 5 and an end surface of the roll's 6 protrusions 7, 7' are at a minimum distance from each other.

In the embodiment of FIG. 1, the roll 6 has its protrusions 7, 7' designed in such a way that the protrusions 7 melt grooves in the cellular plastic material 3 longitudinal of its web and the protrusions 7' melt grooves in the cellular plastic material 3 lateral of its web. Hence, the grooves providing an air provision for the manufactured underlay material 8 make up a pattern of squares on the bottom surface of the cellular plastic material 3.

Temperature of the roll 6 and/or its protrusions 7, 7' is set sufficiently high for melting the cellular plastic material 3. This temperature may also accomplish partial melting of the sheet material 1, which in turn enhances bonding of the cellular plastic material 3 to the sheet material 1. In order to prevent excessive melting of the sheet material 1, the roll 5 and/or its surface can be cooled as necessary. In view of melting for example a cellular plastic material of polyethylene, the temperature suitable for the roll 6 and/or its protrusions 7, 7' is about 140° C.

Figure 2:
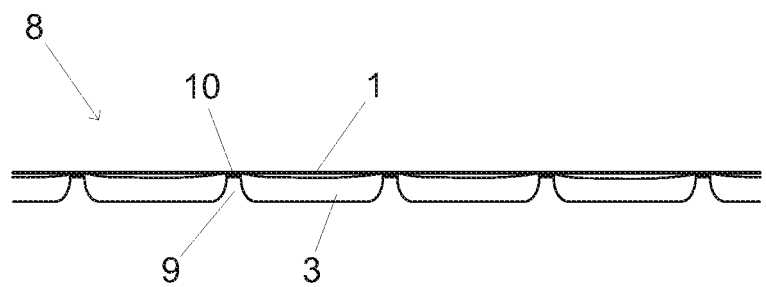
FIG. 2 shows schematically one underlay material of the invention in cross-section.

FIG. 2 shows schematically a cross-section of one underlay material 8, which is manufactured with a solution according to the invention and made up of a sheet material 1 and a cellular plastic material 3. It can be seen from this cross-section how a cellular plastic material 10 melted and packed on the bottom of grooves 9 in connection with manufacturing the underlay material 8 has bonded to the sheet material 1 for producing the underlay material 8.

Figure 3A:
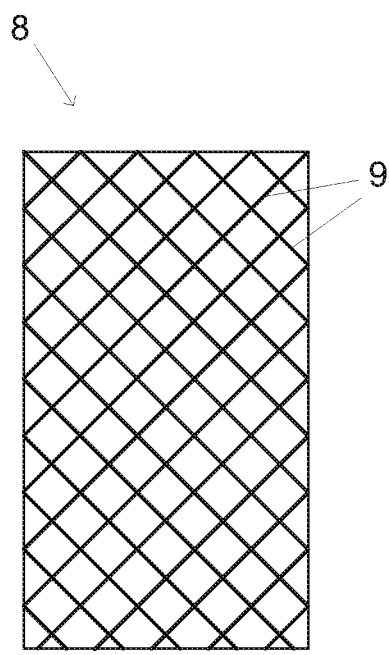
FIGS. 3A and 3B illustrate examples of air provision patterns made up of grooves in an underlay material of the invention.
Figure 3B:
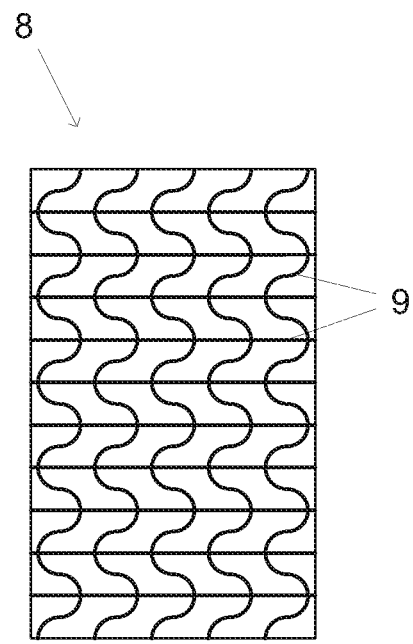

FIGS. 3A and 3B illustrate optional air provision patterns defined by grooves 9 made in a cellular plastic material on the bottom surface of an underlay material 8. As indicated by these patterns, the air provision-establishing continuous grooves 9 can be formed on the surface of a cellular plastic material quite arbitrarily for designing various patterns as long as such grooves nevertheless make up continuous paths across the surface area of the underlay material 8 for the expulsion and removal from under the underlay material of possible moisture building up on a bottom surface of the underlay material.

The solution of the invention is not bound to the use of plastic membranes as a sheet material 1, but other suitable sheet materials can also be used, such as for example paper or cardboard.

The cellular plastic material 3 employed in the solution of the invention comprises preferably a suitable flexible foamed polymer, such as for example cellular polyethylene or polypropylene plastic 1-5 mm in thickness.

The finished underlay material 8 is preferably about 1-5 mm in thickness.

Regarding the embodiments shown in the figures and described above, it should be appreciated that these are just examples of solutions according to the invention and, as such, by no means limiting the invention. The scope of protection for the invention is defined in the appended claims.

The invention claimed is:

1. A method for manufacturing an underlay material to be set under parquet or a laminate, said underlay material consisting of a sheet material layer and a flexible cellular plastic material layer bonded under the sheet material layer, and a bottom surface of said cellular plastic material layer being processed for providing an air space, wherein the bottom surface of the cellular plastic material layer is processed by melting cellular plastic material of the cellular plastic material layer locally, thereby providing the air space and simultaneously bonding the cellular plastic material layer to the sheet material layer only at an area of recesses formed by melting the cellular plastic material.

2. A method according to claim 1, wherein the melting and bonding of the cellular plastic material layer to the sheet material layer is conducted by conveying the material layers through between first and second rolls set in opposition to each other, whereby the first roll is in contact with the cellular plastic material layer and has a surface formed with uniform protrusions, at least the protrusions of the first roll being heated.

3. A method according to claim 1, wherein the cellular plastic material layer is by melting formed with at least two sets of continuous and parallel grooves, the grooves of the at least two sets crossing each other to make up a pattern of squares or lozenges on the bottom surface of the cellular plastic material layer.

4. A method according to claim 2, wherein the cellular plastic material layer is by melting formed with at least two sets of continuous and parallel grooves, the grooves of the at least two sets crossing each other to make up a pattern of squares or lozenges on the bottom surface of the cellular plastic material layer.

5. A method according to claim 1, wherein the sheet material layer is made of plastic, paper or cardboard.

6. A method according to claim 2, wherein the sheet material layer is made of plastic, paper or cardboard.

7. A method according to claim 3, wherein the sheet material layer is made of plastic, paper or cardboard.

8. A method according to claim 4, wherein the sheet material layer is made of plastic, paper or cardboard.

9. A method according to claim 1, wherein the cellular plastic material layer is made of a foamed polymer or polymer blend.

10. A method according to claim 2, wherein the cellular plastic material layer is made of a foamed polymer or polymer blend.

11. A method according to claim 3, wherein the cellular plastic material layer is made of a foamed polymer or polymer blend.

12. A method according to claim 4, wherein the cellular plastic material layer is made of a foamed polymer or polymer blend.

13. A method according to claim 1, wherein the cellular plastic material layer is made of a foamed polymer or polymer blend and is in the form of a material web.

14. A method according to claim 2, wherein the cellular plastic material layer is made of a foamed polymer or polymer blend and is in the form of a material web.

15. A method according to claim 3, wherein the cellular plastic material layer is made of a foamed polymer or polymer blend and is in the form of a material web.

16. A method according to claim 4, wherein the cellular plastic material layer is made of a foamed polymer or polymer blend and is in the form of a material web.

17. A method according to claim 1, wherein the sheet material layer is made of plastic, paper or cardboard and is in the form of a material web.

18. A method according to claim 2, wherein the sheet material layer is made of plastic, paper or cardboard and is in the form of a material web.

19. A method according to claim 3, wherein the sheet material layer is made of plastic, paper or cardboard and is in the form of a material web.

20. A method according to claim 4, wherein the sheet material layer is made of plastic, paper or cardboard and is in the form of a material web.

\* \* \* \* \*